United States Patent [19]

Seynhaeve et al.

[11] Patent Number: 5,408,560
[45] Date of Patent: Apr. 18, 1995

[54] TENSILE MEMBER FOR COMMUNICATION CABLES

[75] Inventors: Geert Seynhaeve, Wevelgem; Gerard Vandewalle, Deerlijk; Johan Veys, Oudenaarde, all of Belgium

[73] Assignee: N.V. Bekaert S.A., Belgium

[21] Appl. No.: 187,170

[22] Filed: Jan. 27, 1994

[30] Foreign Application Priority Data

Feb. 26, 1993 [EP] European Pat. Off. ............ 93870030

[51] Int. Cl.$^6$ .......................... G02B 6/44; H01B 7/28; H01B 13/00
[52] U.S. Cl. ................................. 385/101; 174/68.1; 174/113 R; 174/115; 174/131 R; 174/131 A
[58] Field of Search ................ 174/113 R, 115, 126.1, 174/113 C, 131 A, 131 R, 68.1, 69; 385/101, 103; 156/47, 50, 51

[56] References Cited

U.S. PATENT DOCUMENTS

| | | | |
|---|---|---|---|
| 2,589,507 | 3/1952 | Noyes | 174/131 R |
| 3,549,788 | 12/1970 | Apen et al. | 174/115 |
| 3,699,237 | 10/1972 | Melia | 174/115 |
| 4,196,307 | 4/1980 | Moore et al. | 174/131 A |
| 4,371,234 | 2/1983 | Parfree et al. | 385/103 |
| 4,657,342 | 4/1987 | Bauer | 385/103 |
| 4,976,509 | 12/1990 | Bachmann et al. | 385/101 |
| 5,122,622 | 6/1992 | Reuss et al. | 174/113 C |
| 5,202,944 | 4/1993 | Riorden | 385/101 |

FOREIGN PATENT DOCUMENTS

| | | | |
|---|---|---|---|
| 3336617 | 4/1985 | Germany . | |
| 153235 | 8/1985 | Japan | 385/101 |
| 2063502 | 6/1981 | United Kingdom . | |
| 2147138 | 5/1985 | United Kingdom | 385/101 |
| 2157847 | 10/1985 | United Kingdom . | |

*Primary Examiner*—Morris H. Nimmo
*Attorney, Agent, or Firm*—Nixon & Vanderhye

[57] ABSTRACT

A communication cable (10) comprises optical fibres (24) and/or metal conductors (20) for the transmission of information, and a tensile member, the tensile member comprising a steel strand and synthetic material. The steel strand has a modulus of elasticity of at least 140 000 N/mm$^2$. The steel strand comprises a core wire (12) and one layer of layer wires (14) surrounding the core wire. A contact is provided between the layer wires and the core wire. The interstices between the layer wires and the core wire are filled with a first synthetic material (13) having a melting-point above 150° C. The steel strand is covered by a layer of a second synthetic material (16). The filling with the first synthetic material and the covering by a layer of a second synthetic material is such that watertightness is obtained in the longitudinal direction of the tensile member.

25 Claims, 1 Drawing Sheet

TENSILE MEMBER FOR COMMUNICATION CABLES

FIELD OF THE INVENTION

The present invention relates to a communication cable which comprises optical fibres and/or metal conductors for the transmission of information and a tensile member. The tensile member is preferably located in the center of the cable. The optical fibres and/or the metal conductors such as copper wires are arranged around the center of the cable. The optical fibres may be present in a tight buffer coating or, more commonly, in a loose polyethylene jacket.

BACKGROUND OF THE INVENTION

In order to be suitable as a tensile member for communication cables, a number of different severe requirements must be met. The tensile member must be flexible, must be hundred per cent watertight and, although it must have a determined elastic elongation, its elongation must not exceed a predetermined value, since otherwise the metal conductors or the optical fibres could be put under a tensile strain, which is to be avoided. The tensile member is further required to withstand compressive forces and to be of low cost.

The prior art provides a die-formed steel strand as a tensile member for communication cables. A die-formed steel strand comprises a core wire and a layer of layer wires which have been plastically compressed by means of a die. This plastical compressing is done in order to obtain a high tensile modulus. The drawback, however, is that longitudinal capillarities remain between the plastically deformed layer wires and the core wire. As a consequence, watertightness is not guaranteed in the longitudinal direction of the steel strand. A prior art solution has tried to overcome the problem of watertightness by injecting bitumen during the twisting process of the individual steel wires. This solution has the drawback that if the steel strand is heated prior to an extrusion process in order to enhance the adhesion of the steel strand to the extruded synthetic material, the bitumen melts and at least part of the bitumen gets lost before extrusion, which results in uncomplete filled capillarities and in a dirty work floor. Complete watertightness is not guaranteed in this case. Non-heating of the steel strand prior to extrusion, holds the bitumen in the steel strand but decreases the adhesion of the steel strand to the extruded synthetic material. It goes without saying that loss of adhesion between the steel strand and the synthetic material is at the expense of the watertightness again.

It is an object of the present invention to avoid the drawbacks of the prior art. It is an object of the present invention to provide for a communication cable, the tensile member of which is watertight in longitudinal direction, has a limited elastic elongation and is of low cost.

SUMMARY OF THE INVENTION

According to a first aspect of the present invention, there is provided a communication cable which comprises optical fibres and/or metal conductors for the transmission of information and a tensile member for preventing the optical fibres and/or metal conductors from being put under a tensile load. According to a second aspect of the present invention, there is provided a tensile member for a communication cable.

The tensile member comprises a steel strand and a first and second synthetic material. The first synthetic material has a melting point above 150° C., preferably above 180° C., e.g. above 200° C. or 210° C. The steel strand has a modulus of elasticity of at least 140.000 N/mm$^2$, preferably at least 150.000 N/mm$^2$ and most preferably at least 160.000 N/mm$^2$, in order to limit the degree of elongation. The steel strand comprises a core wire and at least one layer of layer wires surrounding the core wire. Preferably, there is only one layer of layer wires for reasons of economy. Any interstices between the layer wires and the core wire are filled with the first synthetic material. The steel strand is covered by a layer of a second synthetic material. The filling with the first synthetic material and the covering by a layer of a second synthetic material are such that watertightness is obtained in the longitudinal direction of the tensile member.

By the terms "watertightness in the longitudinal direction of the tensile member" is not necessarily meant that bubbles are totally excluded at every single cross-section of the tensile member. These terms do mean that travelling of moisture along a distance of several centimeters in the longitudinal direction of the tensile member is prohibited.

In the context of the present invention the watertightness in the longitudinal direction of the tensile member is measured according to the German norm DIN VDE 0472 Teil 811.

The first synthetic material which has to fill the interstices between the layer wires and the core wire, preferably has a melt viscosity in the range of 50 to 200 Pa.s.

The first synthetic material can be equal to or different from the second synthetic material.

If the first synthetic material is equal to the second synthetic material, it can be a polyamide, such as nylon, or a polyester. If the first synthetic material is different from the second synthetic material, the first synthetic material can be a hot melt polymer, while the second synthetic material can be a polyamide, such as nylon, or a polyester. Another example of embodiment is as follows: the first synthetic material is a polyamide and the second synthetic material is a polyethylene.

A second layer of a third synthetic material can be provided around the first layer. This third synthetic material can be a polyethylene. This embodiment has, however, the disadvantage of an increase in cost.

At least one layer wire is preferably in a steel to steel contact with the core wire in order to limit as much as possible the elongation of the tensile member. The twist pitch of the steel strand is preferably greater than twenty times the core wire diameter for the same reason and also in order to limit the number of residual torsions. The elastic elongation of the tensile member is preferably smaller than 1.5 per cent, and the total elongation at fracture is preferably smaller than 2.8 per cent.

The diameter of the core wire and of the layer wires ranges from 0.50 mm to 2.0 mm.

The core wire and the layer wires are not necessarily covered with one or another metal coating such as brass, copper, zinc or a zinc alloy. Some of them are preferably covered with up to 2.5 g/m$^2$ of phosphate, e.g. 1 g/m$^2$ or 1.5 g/m$^2$.

In order to facilitate penetration of the first synthetic material into the steel strand in the case of only one layer, the layer wires may have an openness of at least three per cent, preferably at least five per cent. The openness is herein defined as:

openness $(\%) = 100 \times \{1 - n \times \arcsin[d_1 / \| (d_0 + d_1)]\}$ wherein
- $d_0$ is the diameter of the core wire with inclusion of a possible coating;
- $d_1$ is the diameter of the layer wires with inclusion of a possible coating;
- n is the number of layer wires.

In a preferable embodiment of the invention the steel strand comprises one layer of six layer wires. The core and layer wire diameters all range from 0.50 to 2.0 mm, and preferably from 0.70 to 1.60 mm.

The ratio of the core wire diameter to the layer wire diameter in the case of six layer wires ranges from 1.02 to 1.30 and preferably from 1.05 to 1.20. The lower limits are necessary to provide the required openness. The higher limits are imposed by considerations of structural stability.

The breaking load of the steel strand is greater than 5000 N, and preferably greater than 7000 N, e.g. greater than 8000 N. The tensile strength of twisted steel strand is greater than 1400 N/mm², and preferably greater than 1500 N/mm², e.g. greater than 1550 N/mm².

The twisted steel strand together with the one or more layers of synthetic material is free of residual torsions.

The steel strand may be located in the center of the cable.

According to a third aspect of the present invention, there is provided a method of making a tensile member for communication cables. The method comprises following steps:
- providing a steel wire as core wire for the tensile member;
- providing one layer of layer wires around the core wire such that a steel strand with a modulus of elasticity of at least 140 000 N/mm² is obtained;
- filling any interstices between the core wire and the layer wires in the steel strand with a first synthetic material which has a melting point above 150° C.;
- covering the thus filled steel strand with a second synthetic material such as polyethylene.

One possible way of filling the interstices between the core wire and the layer wires with a first synthetic material is to provide a first relatively thin layer of a synthetic material which has following features.
(1) it has a good adhesion to the metal surface of the steel strand;
(2) under the manufacturing circumstances of temperature and pressure, its viscosity is of a kind that penetration until the core wire of the steel strand is guaranteed.

An example of a synthetic material in this respect is nylon or polyester, which may be extruded around the steel strand. Another example of a synthetic material in this respect is a suitable hot melt polymer, which may be injected in the steel strand during the twisting process. The result is that in the twisted steel strand the hot melt polymer is in contact with the core wire and fills up the interstices between the layer wires.

According to a fourth aspect of the present invention, there is provided a method for manufacturing a tensile member for communication cables. The method comprises following steps:
- providing a steel wire as core wire for the tensile member;
- covering said core wire with a first synthetic material such as a polyamide or a polyester with a melting point above 150° C.;
- providing one layer of layer wires around the thus coated core wire in order to obtain a strand;
- preheating the thus obtained strand in order to soften the first synthetic material;
- covering the thus preheated strand with a second synthetic material such as polyethylene.

BRIEF DESCRIPTION OF THE DRAWINGS

The invention will now be described in more detail with reference to the accompanying drawings wherein.

DESCRIPTION OF A PREFERABLE EMBODIMENT OF THE INVENTION

Figure 1:
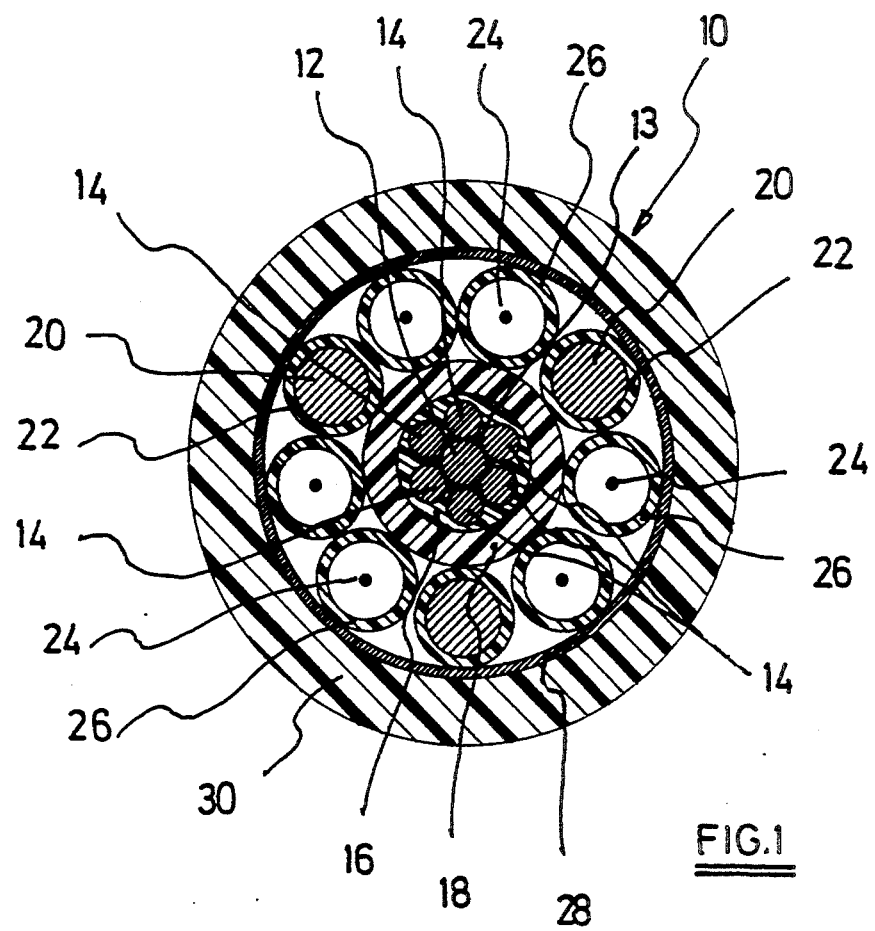
FIG. 1 illustrates the cross-section of a communication cable according to the present invention wherein the tensile member comprises two layers of synthetic material and wherein the core wire has been covered with a first synthetic material.

FIG. 1 illustrates a cross-section of a communication cable 10 which comprises a tensile member in its center. The tensile member comprises a core wire 12 with a diameter of 1.10 mm which has been extruded with a nylon coating 13 prior to the twisting operation. The tensile member further comprises six surrounding layer wires 14 with a diameter of 0.95 mm. The layer wires 14 penetrate partly through the nylon coating 13 and sometimes realize a steel to steel contact with the core wire 12. The twist pitch of the layer wires 14 is 38 mm. The thus formed strand 12,13,14 has been covered with a first layer 16 of polyester until a diameter of about 3.20 mm. A second layer 18 of polyethylene is provided around the layer 16. The total diameter of the tensile member with inclusion of the two layers of synthetic material amounts to 3.90 mm.

A number of copper conductors 20 with a protection sheath 22 and a number of optical fibres 24 with a polyethylene jacket 26 are arranged around the central tensile member. The whole is protected by means of paper tapes and/or an aluminium foil 28 and by means of a polyethylene sheath 30.

Figure 2:
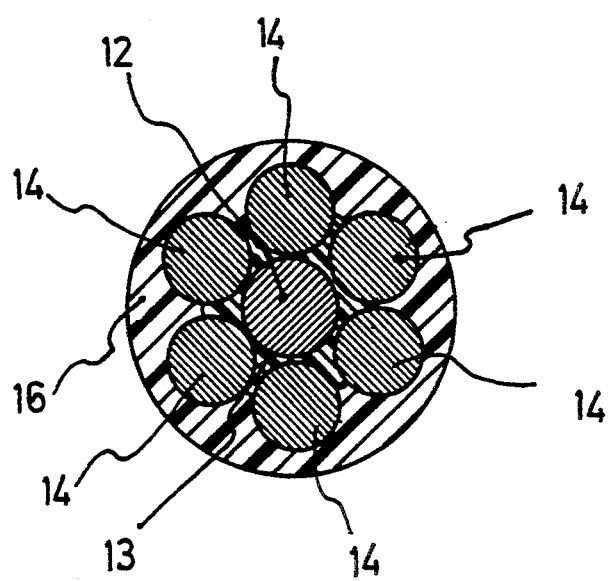
FIG. 2 illustrates the cross-section of a tensile member for communication cables according to the present invention wherein the tensile member comprises a first synthetic material around the core wire and a layer of a second synthetic material around the layer wires.

FIG. 2 illustrates somewhat in more detail a cross-section of a tensile member according to the present invention. The tensile member, comprises a core wire 12 which has been covered with a layer 13 of nylon as a first synthetic material. No longitudinal voids which are larger than 1 cm are present between the core wire 12 and the nylon layer 13.

Six layer wires 14 with a wire diameter somewhat smaller than the core wire diameter have been twisted around the core wire 12 and penetrate at least partly into the relatively soft nylon layer 13 thereby avoiding longitudinal voids between the nylon layer 13 and the layer wires 14 and thus forming a stable steel strand construction since the layer wires 14 are no longer able to move circumferentially. A layer 16 of polyethylene as a second synthetic material covers the above strand. Between the polyethylene layer 16, on the one hand, and the nylon layer 13 or the layer wires 14, on the other hand, no longitudinal voids larger than 1 cm are present.

An example where the first synthetic material is equal to the second synthetic material is as follows: a core wire of 0.70 mm covered with a polyamide layer, six layer wires of 0.65 mm around the core wire and an outer layer of polyamide so that an external diameter of 2.10 mm is reached.

This embodiment has the advantage that it remains very flexible.

Following wire rod composition is suitable for the steel wires of the tensile member: a carbon content between 0.40 and 0.80 per cent, a manganese content between 0.30 and 0.80 per cent, a silicon content between 0.15 and 0.40 per cent, maximum sulphur and phosphorus contents of 0.050 per cent.

A possible method of manufacturing a tensile member for a communication cable comprises a number of following processing steps: phosphatizing the steel wires, drawing the steel wires until the final diameter, degreasing the steel wires, extruding the core wire with nylon or polyester, twisting the steel wires by means of a tubular stranding machine or by means of a double-twisting machine, preheating the thus twisted strand in order to soften the nylon or polyester layer and extruding the preheated strand with a layer of polyethylene. Removal of the residual torsions can be done in the convenient way by means of an overtwisting operation prior to extrusion.

Partly penetration of the first synthetic material by the layer wires until the core wire can be realized by guiding the twisted steel strand through a cabling die so that the layer wires are radially pressed until they contact the steel of the core wire.

Preheating of the twisted strand prior to extrusion with the polyethylene is done in order to realize a good contact between the nylon or polyester and the polyethylene and to avoid the formation of longitudinal voids.

In addition to the above-mentioned advantage of constructional stability, prior coating of the core wire with nylon or polyester (instead of filling the interstices between the layer wires and the core wire after the twisting process of the steel strand) has also following advantage:

during the subsequent extrusion process for providing the layers of synthetic material around the steel strand, the working pressure may be decreased and the linear speed may be increased, since the interstices between core wire and layer wires have already been filled.

If more than one layer of synthetic material is to be extruded around the steel strand, use can be made of a co-extrusion equipment.

If nylon or polyester is not provided on the core filament prior to the twisting process, and if during extrusion the synthetic material does not penetrate sufficiently until the core wire and realize a hundred per cent watertightness, one or more of the following measures can be taken, either alone or in combination:
(1) increasing the working pressure;
(2) using a longer extruder head;
(3) decreasing the linear velocity of the steel strand.

We claim:

1. A communication cable comprising
   optical fibres and/or metal conductors for the transmission of information, and
   a tensile member, for preventing the optical fibres and/or metal conductors from being put under a tensile load,
   the tensile member comprising a steel strand and a first and second synthetic material, the first synthetic material having a melting point above 150° C.,
   the steel strand having a modulus of elasticity of at least 140.000 N/mm$^2$,
   the steel strand comprising a core wire and at least one layer of layer wires surrounding the core wire,
     any interstices between the layer wires and the core wire being filled with said first synthetic material,
   the steel strand being covered by a layer of said second synthetic material,
   the filling with the first synthetic material and the covering by a layer of a second synthetic material being such that watertightness is obtained in the longitudinal direction of the tensile member.

2. A cable according to claim 1 wherein the first synthetic material is equal to the second synthetic material.

3. A cable according to claim 2 wherein the first synthetic material is a polyamide or a polyester.

4. A cable according to claim 1 wherein the first synthetic material is different from the second synthetic material.

5. A cable according to claim 4 wherein the first synthetic material is a hot melt polymer and the second synthetic material is a polyamide or a polyester.

6. A cable according to claim 4 wherein the first synthetic material is a polyamide and the second synthetic material is a polyethylene.

7. A cable according to claim 1 wherein the first synthetic material has a melt viscosity ranging from 50 to 200 Pa.s.

8. A cable according to claim 1, wherein the tensile member further comprising a second layer of a third synthetic material which surrounds the tensile member.

9. A cable according to claim 8 wherein the third synthetic material is a polyethylene.

10. A cable according to claim 1 wherein at least one layer wire has a steel to steel contact with the core wire.

11. A cable according to claim 1 wherein the diameter of the core wire and of the layer wires ranges from 0.50 to 2.0 mm.

12. A cable according to claim 1 wherein only one layer of layer wires has been provided and the layer wires have an openness of at least three per cent.

13. A cable according to claim 1 wherein the steel strand has one layer of six layer wires.

14. A cable according to claim 13 wherein the ratio core wire diameter to layer wire diameter ranges from 1.02 to 1.30.

15. A cable according to claim 1 wherein the twist pitch of the steel strand is greater than twenty times the core wire diameter.

16. A cable according to claim 1 wherein at least some of the wires of the steel strand are covered with up to 2.5 g/m$^2$ of phosphate.

17. A cable according to claim 1 wherein the breaking load of the steel strand is at least 5000 N.

18. A cable according to claim 1 wherein the tensile strength of the steel strand is at least 1400 N/mm$^2$.

19. A cable according to claim 1 wherein the tensile member has an elastic elongation which is smaller than 1.5 per cent.

20. A cable according to claim 1 wherein the tensile member has a total elongation at fracture which is smaller than 2.8 per cent.

21. A cable according to claim 1 wherein the tensile member is free of residual torsions.

22. A tensile member for communication cables, the tensile member comprising a single steel strand and a first and second synthetic material, the first synthetic material having a melting point above 150° C., the steel strand having a modulus of elasticity of at least 140.000 N/mm$^2$, the steel strand comprising a core wire and at least one layer of layer wires surrounding the core wire, the interstices between the layer wires and the core wire being filled with said first synthetic material, the steel strand being covered by a layer of the second synthetic material, the filling with the first synthetic material and the covering by a layer of a second synthetic material being such that watertightness is obtained in the longitudinal direction of the tensile member.

23. A method of making a tensile member for communication cables watertight in its longitudinal direction, said method comprising:

providing a steel wire as core wire for the tensile member;

providing one layer of layer wires around the core wire such that a steel strand with a modulus of elasticity of at least 140 000 N/mm$^2$ is obtained;

filling any interstices between the core wire and the layer wires in the steel strand with a first synthetic material, said first synthetic material having a melting point above 150° C.;

covering the thus filled steel strand with a second synthetic material.

24. A method of manufacturing a tensile member for communication cables, said method comprising:

providing a steel wire as a core wire for the tensile member;

covering said core wire with a first synthetic material, said first synthetic material having a melting point above 150° C.;

providing one layer of layer wires around the thus coated core wire in order to obtain a strand;

covering the thus obtained strand with a second synthetic material.

25. A method according to claim 24 wherein the strand is preheated in order to soften said first synthetic material prior to the covering of the strand with the second synthetic material.

* * * * *